United States Patent [19]

Christian et al.

[11] Patent Number: 5,109,715
[45] Date of Patent: May 5, 1992

[54] LOCATION DESIGNATOR FOR WHEEL SERVICE MACHINES

[75] Inventors: Donald J. Christian, Fremont, Calif.; Steven W. Rogers, Conway, Ark.

[73] Assignee: FMC Corporation, Chicago, Ill.

[21] Appl. No.: 772,294

[22] Filed: Oct. 7, 1991

Related U.S. Application Data

[63] Continuation of Ser. No. 656,929, Feb. 19, 1991, abandoned.

[51] Int. Cl.$^5$ ............................................ G01M 19/00
[52] U.S. Cl. ..................................... 73/865.9; 73/146; 73/460
[58] Field of Search ...................... 73/118.1, 146, 460, 73/461, 462, 463, 458, 457, 464, 465, 466, 467, 865.9

[56] References Cited

U.S. PATENT DOCUMENTS 4,670,289 6/1987 Miller, III ..................... 73/146 X
4,837,980 6/1989 Rogers, Jr. ...................... 73/146

FOREIGN PATENT DOCUMENTS 1511141 4/1974 United Kingdom .
2081453 7/1981 United Kingdom .

Primary Examiner—Jerry W. Myracle
Attorney, Agent, or Firm—H. M. Stanley; R. C. Kamp; R. B. Megley

[57] ABSTRACT

The disclosure herein relates to a wheel service machine, such as a wheel balancer, which provides audible output for guiding an operator to measured positions on a vehicle wheel assembly where corrective operations must be performed, such as the application of wheel assembly unbalance compensation weights.

31 Claims, 2 Drawing Sheets

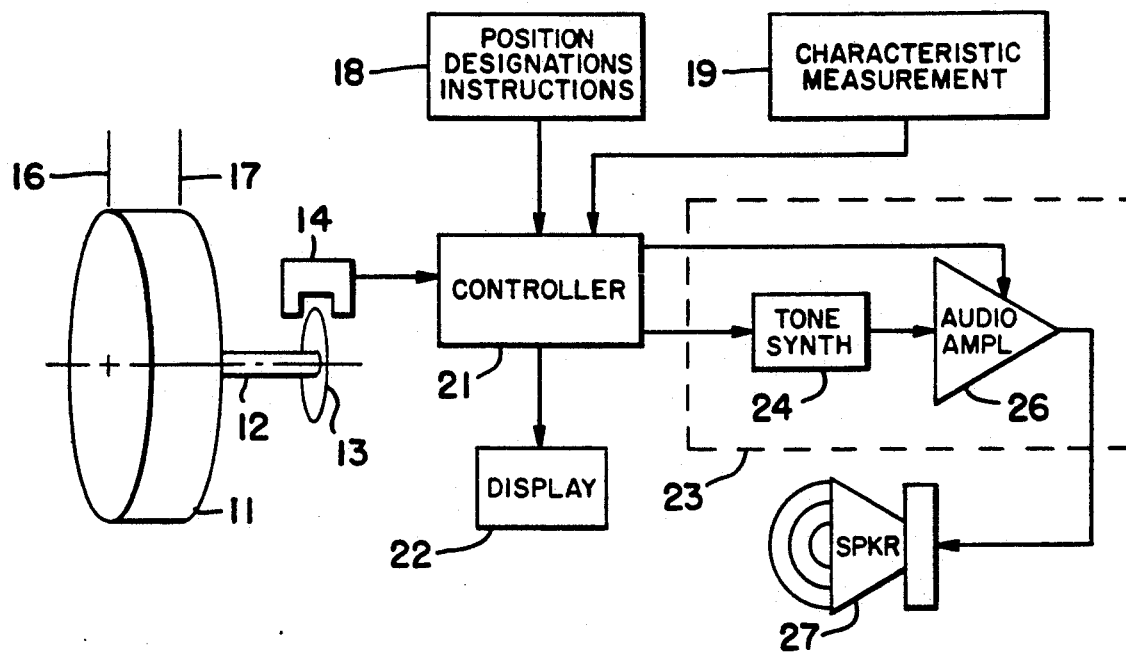
FIG_1
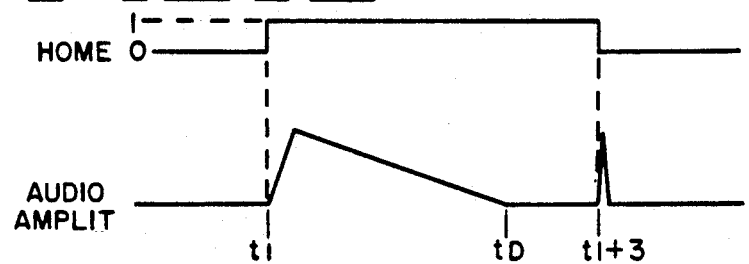
FIG_2
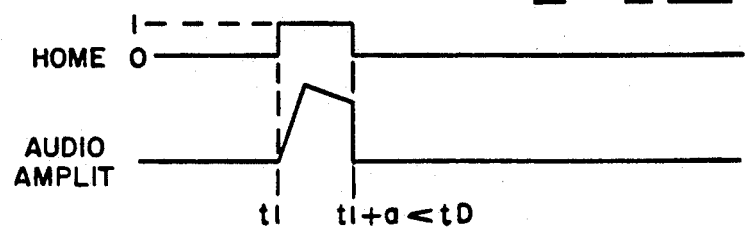
FIG_3

FIG_4
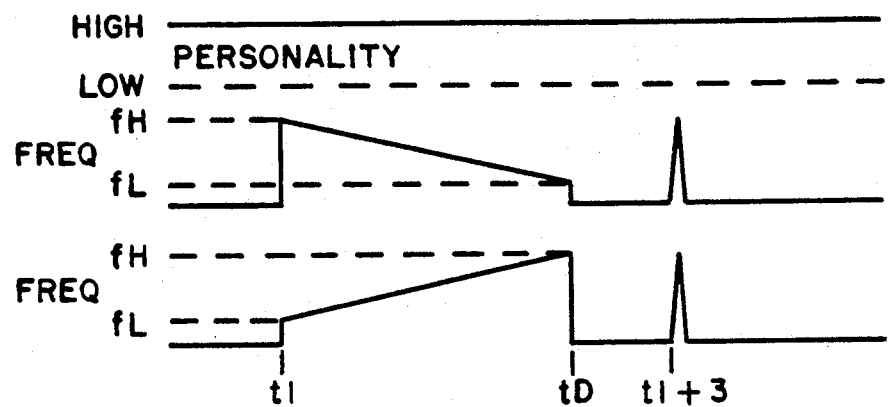
FIG_5
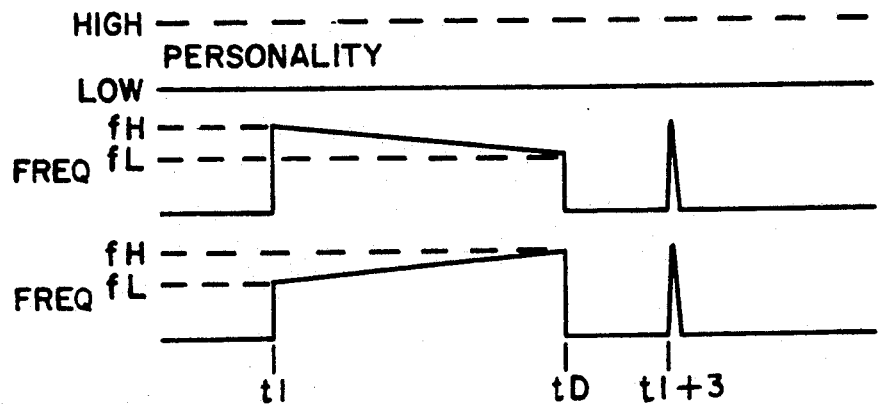

LOCATION DESIGNATOR FOR WHEEL SERVICE MACHINES

This application is a continuation division, of application Ser. No. 07/656,929, filed Feb. 19, 1991.

SUMMARY OF THE INVENTION

The invention disclosed herein relates to a wheel service machine wherein a vehicle wheel assembly is disposed for rotation on a shaft having a shaft encoder for providing shaft angular position data relative to the machine and a controller coupled to receive the shaft angular position data. Means is provided for measuring a predetermined characteristic of the wheel assembly and for providing output indicative of the measurement connected to the controller. Means is also provided for indicating the results of the predetermined characteristic measurement to a wheel service machine operator. An improvement is provided which includes means for entering wheel assembly position designation instructions relating to the predetermined characteristic, the controller being connected to receive the wheel assembly position designation instructions and providing position designation control signals responsive to the instructions, shaft angular position data, and output indicative of the characteristic measurement. Further, audio frequency synthesizer means is connected to receive the position designation control signals for providing audio frequency output signals of predetermined duration in response thereto and audio means is provided for receiving the audio frequency output signals and for producing audio output system signal responsive thereto and indicative of position a of substantial displacement of the wheel assembly measured characteristic relative to a service machine reference position.

A method is disclosed for identifying the position of a designated characteristic of a wheel assembly relative to a reference position adjacent to the wheel assembly, including the steps of monitoring the angular position of the wheel assembly to obtain instantaneous wheel assembly position data, measuring the position of the designated characteristic to be identified and storing the measurement data, combining the wheel assembly angular position data and the measurement data for the designated characteristic to provide position identification control signals, and synthesizing audio frequency output signals responsive to the position identification control signals. Further, the step is included of providing audio output of predetermined duration responsive to the audio frequency output signals when the measured designated characteristic position is in known position relative to the reference position.

A wheel service machine for providing angular location identification relative to a reference location on the machine for designated characteristics of a wheel assembly mounted on a rotatable shaft in the wheel service machine is disclosed herein. The machine includes a shaft encoder for providing instantaneous shaft angular position data, means for measuring the designated characteristics and for providing measurement output indicative thereof, means for entering position designation instructions into the wheel service machine relating to the designated characteristics, and a controller connected to receive shaft angular position data, measurement output, and position designation instructions and providing position designation control signals responsive thereto. Also included is means connected to the controller for synthesizing audio frequency output signals responsive to the position designation control signals, and audio output means receiving the synthesized audio frequency output signals for providing audio output of predetermined duration therefrom indicative of measurement output position relative to the machine reference location.

BRIEF DESCRIPTION OF THE DRAWINGS

FIG. 1 is a block diagram of a wheel service machine incorporating the present invention.

FIG. 2 is a graphical presentation of one aspect of the present invention.

FIG. 3 is another graphical presentation of one aspect of the present invention.

FIG. 4 is yet another graphical presentation of characteristics of the present invention.

FIG. 5 is a graphical presentation of an alternative aspect of the present invention.

DESCRIPTION OF THE PREFERRED EMBODIMENTS

The invention disclosed herein relates to wheel service machines which incorporate a mark synthesizer and an audio output speaker. The purpose of wheel service machines in general is to detect and locate certain critical positions on a vehicle wheel assembly which is mounted thereon. Such critical positions may be points on the inner and outer (sometimes termed left and right) planes of the wheel rim where counterbalancing weights must be attached or may be a point on the periphery of a tire at which a high spot is detected, or may be the location of a detected fault on the side wall or periphery of a tire in a vehicle wheel assembly. These positions are identified and are thereafter designated for an operator of the wheel service machine so that appropriate corrective action may be taken in accordance with the detected fault, its location and its magnitude. Two or more such critical positions for identification and location of predetermined characteristics of the wheel assembly may be designated for location on a single assembly. By way of example, a dynamic wheel balancer generally requires compensation for measured unbalance in both a left and a right wheel rim plane and therefore the position of the compensation weights for the unbalance must be located angularly in both the left and right rim planes. Additionally, the purpose of the invention disclosed herein is to rapidly and accurately identify these positions of the designated wheel assembly characteristics for a human operator so that the operator may service the wheel assembly efficiently and accurately.

As seen in FIG. 1 of the drawings, a wheel assembly 11 is mounted on a shaft 12 in a wheel service machine, such as the wheel balancer, and is driven rotatively on the shaft by a drive motor (not shown). The shaft carries a disc 13 attached rigidly thereto which is part of an encoder 14 for providing continuous shaft angular position data as is well known by those of skill in this art. As was mentioned hereinbefore, the wheel assembly 11 has a left plane 16 and a right plane 17 in which it is practical to mount unbalance compensation weights on the wheel rim included in the wheel assembly 11. A block 18 designated "position designation instructions" represents a portion of the disclosed combination which provides for entry of wheel assembly position designation instructions relating to the wheel assembly predetermined or designated characteristics. This component of the disclosed system is represented by a keyboard which is a conventional array of membrane key switches, all within well known technology. Alternatively, the position designation instructions may be entered in the system by means of one or more potentiometers, switches or other controls. The latter approach is more of an analog approach to instruction entry while the former is seen as a digital instruction entry device. The designated characteristics of the wheel assembly to be located by the disclosed apparatus and method are measured by means of a characteristic measurement portion 19 of the service machine.

Wheel assembly position designation instructions relate to instructions fed into the system through the position designation instruction module 18 (i.e., key pad) which causes the controller to look for and angularly identify measured wheel assembly characteristics. These wheel assembly characteristics are said to be predetermined or designated, because an operator decision is made before measurements are taken to look for and angularly locate these characteristics after they have been measured by the wheel service machine.

It may be seen by reference to FIG. 1 that the instantaneous angular position data from the shaft encoder 14, the position designation instructions from either a key pad or an appropriate analog circuitry represented by item 18 and the measurement data from the characteristic measurement portion 19 are all connected to the input of a controller 21 in the system. An operator of the wheel service machine must be apprised of the results of the designated wheel assembly characteristic measurements and an indicator such as a display 22 is provided in the system for that purpose. The operator now knows what has to be done to correct the measured wheel assembly characteristic, but does not yet know where on the wheel assembly the corrective action must be taken. Controller 21 is typified by Model 80C535 microcontroller manufactured by Siemens Components Inc. of Santa Clara, Calif., or by microcontroller Model 68HC11 sold by Motorola of Schaumberg, Ill. A representative visual display is the LED display Model HDSP-N101-hp014D manufactured by Hewlett Packard of Palo Alto, Calif. A typical encoder 14 is represented by the optical electronic angular position encoder style C manufactured by Bourns Inc. of Riverside, Calif.

A mark synthesizer 23 is shown enclosed in dashed lines in FIG. 1. The mark synthesizer includes in one configuration an audio tone synthesizer 24 represented by type M112 sound generator manufactured by SGS Thompson Micro Electronics of Phoenix, Ar. or by type MM 54104 SPC speech synthesizer manufactured by National SemiConductor of Santa Clara, Calif. The mark synthesizer also includes an audio amplifier 26. Both the tone synthesizer 24 and the audio amplifier 26 are operationally controlled by the controller 21. The mark synthesizer provides audio frequency output signals in response to control signals from the controller, which audio frequency output signals are connected to audio means such as a speaker 27 which produces audio output.

There is a reference position adjacent to the wheel assembly 11 which is sometimes called the "home" position and may be located at the 12 o'clock, 6 o'clock, or some other conveniently accessible angular location around the wheel assembly 11. For the sake of this disclosure, the "home" or reference position will be taken at the 12 o'clock position of the wheel assembly 11. As will be hereinafter described, when the measured characteristic, such as the unbalance compensation weight angular location on a wheel assembly as measured by a wheel balancer, is brought substantially to the "home" or reference positron, the audio means or speaker 27 provides an audio output indicative of such substantial alignment, thereby locating the angular position for corrective action to the wheel assembly, in this case application of unbalance compensation weight.

It may be seen from the foregoing that sometimes two or more predetermined characteristics of the wheel assembly must be located, such as necessary unbalance weight compensation in the two separate planes 16 and 17 of FIG. 1. In such a case two or more audio outputs will be provided by the speaker in the disclosed system, each of the audio outputs having distinct characteristics so that an operator may readily determine location in the left hand plane 16 or the right hand plane 17 for application of unbalance compensation weight in the respective planes. When the location for the left hand plane 16 is brought to the 12 o'clock or "home" position in the example herein an audio sound peculiar to left hand plane location is heard by the operator so that there is minimal likelihood of application of unbalance compensation weights in the wrong plane. In like fashion, alignment of the unbalance compensation weight location in the right hand plane 17 with the 12 o'clock or "home" position causes the system to produce a distinct "right hand plane" audio output.

When the wheel assembly 11 is rotated to align one of the predetermined measured characteristics with the reference or "home" position, a corresponding set of position designation control signals is sent by the controller 21 to the mark synthesizer 23. FIGS. 2 through 5 will be used to explain how audible tones are generated which correspond to the position designation control signals so that the audio tones are thereafter formed by the speaker 27.

When the wheel assembly 11 has been rotated to bring the designated wheel assembly characteristic to a 12 o'clock or "home" position, a logical "home" parameter is set to a "true" or "1" condition. It is at a logical 0 otherwise. The controller 21 thereby controls the audio amplifier 26 to provide an audio amplitude output which rises quickly to a maximum beginning at time t1 and extends for a time duration period until time tD (FIG. 2). The time tD minus t1 may generally be about one to two seconds. Upon the wheel assembly being rotated to displace the measured characteristic location from the "home" position, a burst of sound is prompted from the speaker at 27 by the controller 21 through the mark synthesizer 23. This may be seen in FIG. 2 at t1 plus 3. The audio signal of FIG. 2 is generated for each of the designated wheel assembly characteristics for which measurement locations are to be identified as determined by the position designation instructions.

FIG. 3 shows graphically what occurs when the wheel assembly 11 is rotated so that the measured characteristic angular location passes through the "home" position in a time less than the time tD minus t1. As seen therein, the home position is "visited" for a time shorter than the tD minus t1 period, appearing as a duration in FIG. 3 of only the time from t1 to t1 plus a time "a" which is less than tD. The audio amplitude may be seen to be cut off at the time the home position is departed. This abrupt audible interruption is detectible by a machine operator and the wheel assembly may be reversed in rotation to reassume the "home" position if desired.

In the preferred embodiment, the amplitude characteristic of FIGS. 2 and 3 is created by an attack-decay-release procedure which controls the audio amplifier 26.

Turning now to FIG. 4 of the drawings it will be shown how the tones designated for the left plane 16 and the right plane 17 of FIG. 1 are maintained audibly distinct The left plane frequency may be seen to be modulated from a high frequency fH to a low frequency fL over the time period tD minus t1. The right frequency may be seen to be modulated from a low frequency fL to a high frequency fH over the same time period. Therefore, the direction of frequency modulation decreases for the left frequency and increases for the right. Additionally, the left and right onset frequencies are different which also has the effect of making the perception and discrimination time of the operator shorter. It should be understood that the audio amplitude function of FIG. 2 is applied to the frequency modulation of FIG. 4. The frequency modulation is accomplished by a control signal from controller 21 connected to the tone synthesizer 24. Alternatively, the same effect may be obtained by applying a voltage ramp of the polarity indicated in FIG. 4 to the input of a voltage controlled oscillator. FIG. 4 also incorporates a personality feature wherein a personality logic signal is set either high or low. As seen in FIG. 4, the personality logic level is high. The personality control signal is provided by the controller 21.

The effect of the personality signal may more readily be seen by comparison of FIG. 5 with FIG. 4. The personality signal is set to a logical low level in FIG. 5 which causes the modulation of the left and right frequencies to be over a narrower frequency range. It may be seen that the left frequency, for example while starting at approximately the same high frequency fH only drops to a frequency fL in FIG. 5 which is higher than the frequency f1 in FIG. 4. The slope of the frequency modulation ramp is therefore controlled by the personality parameter as illustrated in FIGS. 4 and 5.

In ore embodiment of the present invention the mark synthesizer 23 is simplified by maintaining the output therefrom at a constant amplitude or loudness and varying only the frequency of the output. While the frequency modulation as explained in conjunction with FIGS. 4 and 5 provides ample audio output distinguishing characteristics, the varying amplitude characteristic of the audio output as seen in FIG. 2 provides an additional distinction. Moreover, the varying amplitude creates an easier environment for the machine operator especially when operating the machine for an extended period of time.

The speech synthesizer mentioned hereinbefore may be used as the mark synthesizer 23. The speech synthesizer superimposes a vocal word which provides a specific meaning in the audio output. For example, when the left plane correction vector is aligned with the "home" position the word "left" can be output by the speaker 27. Additionally the speech synthesizer may be used to encode information about the type of designated characteristic detected or its degree of departure from normal. For example, the speech synthesizer may articulate the words "excessive runout" to indicate that an unacceptable level of radial runout or eccentricity has been detected in the wheel assembly 11.

In the event that the angular locations for the left and right planes 16 and 17 of FIG. 1 are coincident (at the same angle), the problem may be identified by alternating rapidly between the left and right tones. This type of audio output gives the impression that both marks are indicated simultaneously. In the event a perfectly balanced tire requires no correcting counterbalance, neither the left or right home parameters will be elevated to a logical one, so no audio output will be produced by the system. This indicates no corrective action is required.

Although the best mode contemplated for carrying out the present invention has been herein shown and described, it will be apparent that modifications and variations may the made without departing from what is regarded to be the subject matter of the invention.

What is claimed is:

1. In a wheel service machine wherein a vehicle wheel assembly is disposed for rotation on a shaft having a shaft encoder for providing shaft angular position data relative to the machine, a controller coupled to receive the shaft angular position data, means for measuring a predetermined characteristic of the wheel assembly and for providing output indicative of the measurement connected to the controller, and means for indicating the results of the predetermined characteristic measurement to a wheel service machine operator, the improvement comprising means for entering wheel assembly position designation instructions relating to the predetermined characteristic, the controller being connected to receive said wheel assembly position designation instructions and providing position designation control signal responsive to said instructions, shaft angular position data and output indicative of the characteristic measurement, audio frequency synthesizer means connected to receive said position designation control signal for providing audio frequency output signals of predetermined duration in response thereto, and audio means for receiving said audio frequency output signals and for producing an audio output position signal responsive thereto and indicative of a position of substantial alignment of the wheel assembly measured characteristic relative to a service machine reference position.

2. The improvement of claim 1 wherein said means for entering wheel assembly position designation instructions comprises analog circuit means.

3. The improvement of claim 1 wherein said means for entering wheel assembly position designation instructions comprises a keyboard and digital circuit means.

4. The improvement of claim 1 wherein said audio frequency synthesizer means comprises a tone generator and an audio amplifier.

5. The improvement of claim 4 wherein said tone generator comprises a voltage controlled oscillator and a ramp generator.

6. The improvement of claim 1 comprising means for terminating said audio frequency output signals when the wheel assembly is in said position of substantial alignment for a time shorter than the predetermined duration.

7. The improvement of claim 1 wherein said audio frequency synthesizer means comprises means for providing audio frequency output signals of changing audio amplitude whereby said audio means provides audio output of changing audio amplitude.

8. The improvement of claim 7 wherein said means for providing audio frequency output signals of changing audio amplitude comprises a controllable audio amplifier.

9. The improvement of claim 1 wherein said audio frequency output means comprises means for providing audio frequency output signals of changing frequency, whereby said audio means provides audio output of changing audio frequency.

10. The improvement of claim 9 wherein said means for providing audio frequency output signals of changing frequency comprises a voltage controlled oscillator.

11. The improvement of claim 1 wherein said audio frequency synthesizer means comprises means for providing a distinct audio frequency output signal when the wheel assembly is displaced from said position of substantial alignment, whereby said audio output means provides audio output indicative thereof.

12. The improvement of claim 1 wherein the wheel service machine is a vehicle wheel balancer and wherein the predetermined characteristics include unbalance in a first and a second wheel plane, said position designation control signals including first and second plane unbalance location signals, said audio frequency synthesizer means comprising means for providing a first audio frequency output signal indicative of said first plane unbalance position relative to said wheel reference position, and means for providing a second audio frequency output signal distinct from said first audio output which is indicative of said second plane unbalance position relative to said wheel reference position.

13. The improvement of claim 12 wherein said means for providing said first and second audio frequency output signals comprise means for providing first and second audio frequency output signals having distinct frequencies.

14. The improvement of claim 12 wherein said means for providing said first and second audio frequency output signals comprise means for providing first and second audio frequency output signals having distinct changes in frequency.

15. The improvement of claim 12 wherein said means for providing first and second audio output signals comprise means for synthesizing first and second voice word frequency outputs.

16. The improvement of claim 1 wherein the wheel service machine is a vehicle wheel inspection machine and wherein the predetermined characteristics include a plurality of tire and rim fault identifications, said position designation control signals including a plurality of fault location signals, said audio frequency synthesizer means comprising means for providing a plurality of audio frequency output signals, one for identifying each of said plurality of tire and rim faults.

17. A method of identifying the position of a designated characteristic of a wheel assembly relative to a reference position adjacent to the wheel assembly, comprising the steps of
monitoring the angular position of the wheel assembly to obtain instantaneous wheel assembly angular position data,
measuring the position of the designated characteristic to be identified and storing the measurement data,
combining the wheel assembly angular position data and the measurement data for the designated characteristic to provide position identification control signals,
synthesizing audio frequency output signals responsive to the position identification control signals, and providing audio output of predetermined duration responsive to the audio frequency output signals when the measured designated characteristic position is in known position relative to the reference position.

18. The method of claim 17 comprising the step of indicating the presence of the designated characteristics.

19. The method of claim 17 wherein the step of synthesizing comprises the steps of
generating an audio tone signal, and amplifying the audio tone signal for a predetermined time duration.

20. The method of claim 19 wherein the step of amplifying comprises the step of controlling the amplifying step to change amplification over the predetermined time duration.

21. The method of claim 19 comprising the step of terminating the amplified audio tone signal when the measured designated characteristic is removed from the known position relative to the reference position within a time less than the predetermined time duration.

22. The method of claim 19 comprising the step of modulating the frequency of the audio tone signal.

23. The method of claim 22 wherein there are first and second designated characteristics, and wherein the step of modulating comprises the steps of modulating the frequency of position identification for the first designated characteristic in one direction, and modulating the frequency of position identification for the second designated characteristic in the other direction.

24. The method of claim 17 comprising the step of producing an audio output distinct from that provided when the measured designated characteristic position is known relative to the reference position when the wheel assembly is moved therefrom following a time longer than the predetermined duration.

25. The method of claim 17 wherein the step of synthesizing audio frequency output signals comprises the step synthesizing voice frequency output signals.

26. A wheel service machine for providing angular location identification relative to a reference location on the machine for designated characteristics of a wheel assembly mounted on a rotatable shaft in the wheel service machine, comprising
a shaft encoder for providing instantaneous shaft angular position data,
means for measuring the designated characteristics and providing measurement output indicative thereof,
means for entering position designation instructions into the wheel service machine relating to the designated characteristics,
a controller connected to receive shaft angular position data, measurement output, and position designation instructions and providing position designation control signals responsive thereto
means connected to said controller for synthesizing audio frequency output signals responsive to said position designation control signals, and
audio output means receiving said synthesized audio frequency output signals for providing audio output of predetermined duration therefrom indicative of measurement output position relative to the machine reference location.

27. The wheel service machine of claim 26 wherein said means for entering comprises a keypad.

28. The wheel service machine of claim 26 wherein said means for entering comprises circuit means having adjustable analog circuit elements for defining the designated characteristics.

29. The wheel service machine of claim 26 wherein said means for synthesizing comprises a tone generator and an amplifier.

30. The wheel service machine of claim 29 wherein said controller comprises means for driving said tone generator in a frequency modulation mode.

31. The wheel service machine of claim 29 wherein said controller comprises means for driving said amplifier in an amplitude modulation mode.

* * * * *